United States Patent [19]

Henriquez

[11] Patent Number: 5,632,591
[45] Date of Patent: May 27, 1997

[54] LADDER STORAGE AND TRANSPORT DEVICE

[76] Inventor: Kenneth R. Henriquez, 4924 N. Chariton Ave., Tampa, Fla. 33603

[21] Appl. No.: 258,673

[22] Filed: Jun. 13, 1994

[51] Int. Cl.⁶ ..................................... B60P 3/00
[52] U.S. Cl. ................. 414/462; 182/127; 224/310
[58] Field of Search ............... 414/462, 491, 414/529; 182/127; 224/310, 324

[56] References Cited

U.S. PATENT DOCUMENTS

| | | | |
|---|---|---|---|
| 2,765,940 | 10/1956 | Nelson | 414/462 |
| 2,859,887 | 11/1958 | Haight | 414/462 |
| 2,946,397 | 7/1960 | Berberich | 414/462 X |
| 3,058,607 | 10/1962 | Kiley | 414/462 |
| 3,826,390 | 7/1974 | Watson | 414/462 |
| 4,826,387 | 5/1989 | Audet | 414/462 |
| 4,844,490 | 7/1989 | Kohler | 414/462 X |
| 4,887,750 | 12/1989 | Dainty | 414/462 X |
| 4,953,757 | 9/1990 | Stevens et al. | 414/462 X |
| 5,058,791 | 10/1991 | Henriquez et al. | 414/462 X |
| 5,071,308 | 12/1991 | Tibbet | 414/462 |

*Primary Examiner*—David A. Bucci
*Attorney, Agent, or Firm*—Arthur W. Fisher, III

[57] ABSTRACT

A ladder storage and transport device for use with a vehicle comprising a ladder positioning assembly including a positioning drive operable in a retracting mode or extending a mode to selectively move a ladder operatively mounted thereon between a retracted position relative to the roof of the vehicle for storage and travel and an extended position relative to the rear of the vehicle for removal therefrom for use of the ladder.

30 Claims, 4 Drawing Sheets

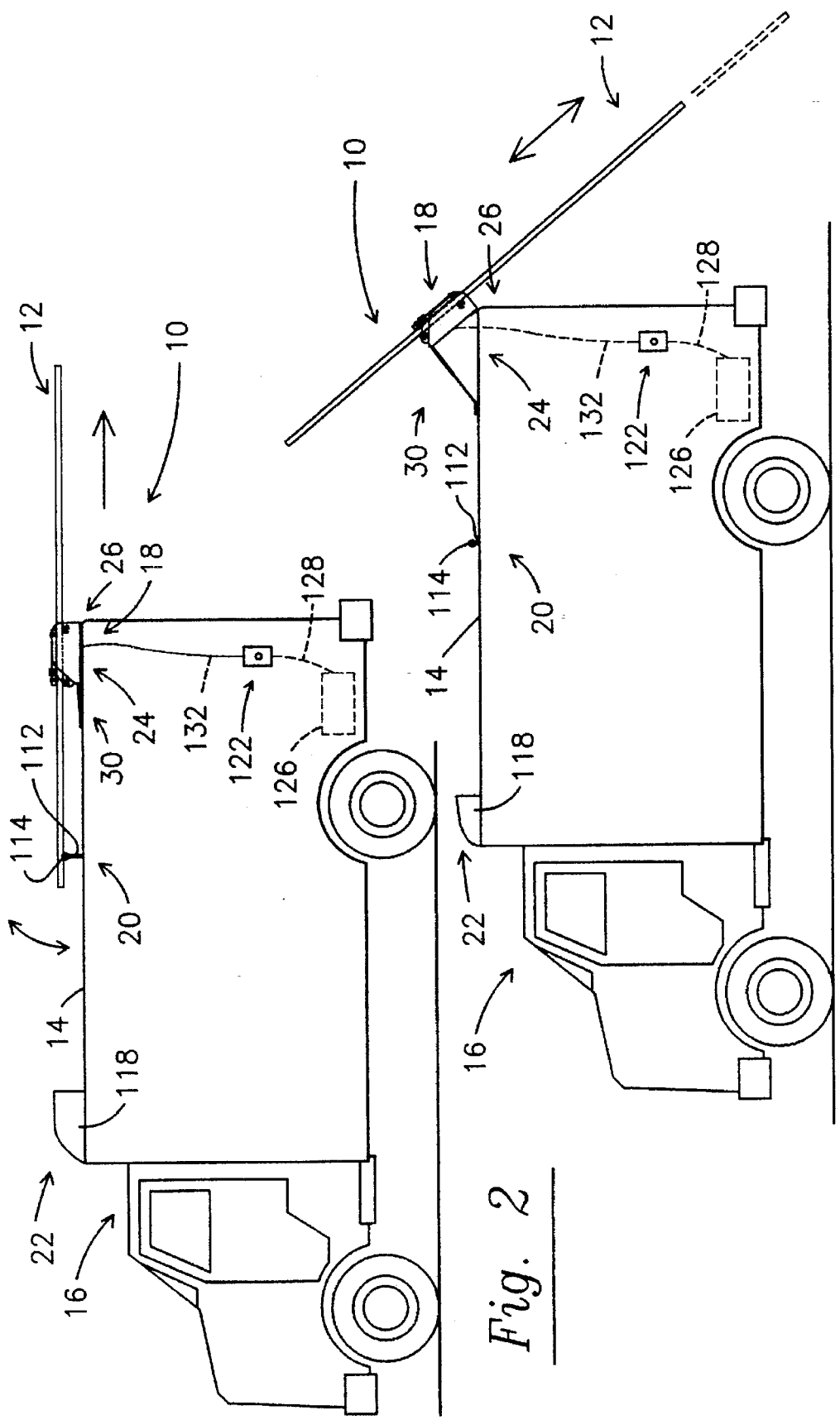

LADDER STORAGE AND TRANSPORT DEVICE

BACKGROUND OF THE INVENTION

1. Field of the Invention

A ladder storage and transport device for use with a vehicle to selectively store or deploy a ladder operably mounted thereon.

2. Description of the Prior Art

It is common to transport ladders on vehicles such as vans and pickup trucks. Generally positioning ladders atop of such vehicles is awkward. In addition, retaining the ladder stationary during travel is difficult. For example, one end of the ladder at a time is ordinarily placed on the rack. Maintaining the first end in place while positioning the other end of the ladder into place may be a problem. Once the ladder is on top of the rack it is ordinarily free to move about producing objectionable noises and causing abrasive wear on the ladder and the rack. Moreover the ladder may become detached from the rack and fall to the ground. Accordingly, a simplified rack is needed that will facilitate mounting the ladders on top of vehicles and then secure the ladder in place to prevent movement and abrasive wear during transport but be easy to remove as desired.

U.S. Pat. No. 3,888,398 describes a rack to hold an elongated article such as a ladder on a vehicle comprising a plurality of coplanar horizontal rollers and spaced apart vertical rollers to facilitate the placing of the ladder on the rack. The ladder is held securely in position against both vertical and horizontal movement by clamping arms each having ends curved to conform to the curvature of the rungs of a ladder mounted on the rack.

U.S. Pat. No. 3,826,390 shows a rack for attachment to the top of a vehicle including rack roller elements to receive a ladder or similar device. A projection may extend upward between the rungs of a ladder to prevent longitudinal movement of the ladder. Furthermore, a clamping device is provided to prevent longitudinal movement of a ladder and/or other material being hauled. An elastomer roller enables the element hauled to be moved thereagainst in rolling relation with the roller thereto to expedite the work involved in loading the rack. The elastomer rollers provide a cushion between the ladder and/or other being hauled and the mounting frame on the vehicle so as to prevent damage to the ladder or other material being hauled to prevent shock to the vehicle.

U.S. Pat. No. 4,877,108 teaches a hydraulically operated ladder brace for transporting, deploying and supporting an extension ladder to be pivotally attached to a rack system mounted on the rear portion of a vehicle. In the transport position, the ladder brace is positioned with a U-shaped frame lying substantially in a horizontal plane and pivotally attached to the rack system. The ladder brace allows deployment from the transport position through activation of a hydraulic pump which causes a ram to extend outwardly from a hydraulic cylinder causing the U-shaped frame to pivot the ladder from a horizontal position into a position of deployment.

U.S. Pat. No. 3,621,935 describes a mobile ladderlike tower on which workmen can ascend to and work at substantial heights above the ground. The tower is mounted on a pickup truck or other vehicle capable of swinging movement between a horizontal stored carrying position overlying the vehicle and a stabilized upright working position. The tower having telescopic sections for selective extension and retraction and includes appropriate elevating and latching devices for the various conditions of storage and use.

U.S. Pat. No. 3,043,398 shows a device for mounting on a vehicle comprising a rear support fixedly mounted to the vehicle and extending upwardly therefrom including a first fixed horizontally disposed cross-brace, a pair of complementary channels pivotally mounted about the first cross-brace and extending forwardly and rearwardly therefrom above the vehicle first spring means, operatively mounted on.

U.S. Pat No. 3,013,681 discloses a device for storing an elongated article on a vehicle comprising a rack with a plurality of arms pivotally connected along an upper portion of the vehicle. The arms are movable about a horizontal axis and extend outwardly at substantially right angles to the length of the vehicle during movement between a down position and upright position.

U.S. Pat. No. 3,058,607 teaches a ladder rack for a vehicle comprising ladder-holding members, a pair of links pivotally attached to the vehicle in coaxial relation to each other at opposite ends thereof. A torque element is provided to transmit a turning force.

U.S. Pat. No. 3,963,136 shows a retractable ladder rack for use on the top of vehicles. The rack has one or more channel members which can be attached to the roof of the vehicle. The rack can slide along the channel members to a lower position to facilitate the loading and unloading of a ladder or similar object.

U.S. Pat. No. 4,170,331 discloses a ladder rack mounted on top of a vehicle including upstanding guide stops to hold one end of a ladder while the other end is being pivoted onto the rack.

U.S. Pat. No. 4,262,834 teaches a vehicle rack comprising a releasable clamping device for releasably clamping a ladder thereto. The clamping device includes a clamp arm which is pivoted to a rigid support and operated by a crank mechanism by moving across a dead-center position to secure the ladder in place.

U.S. Pat. No. 4,390,117 discloses a ladder rack for a vehicle roof comprising clamps for releasable attachment to the roof of a vehicle. A subframe carries front and rear ladder support assemblies each comprising transverse rollers for engaging the stringers of a ladder spanning the two assemblies.

U.S. Pat. No. 4,826,387 teaches a carrier which can be extended and retracted relative to the rack and hinged to facilitate loading and unloading of the material carried by the rack.

U.S. Pat. No. 5,058,791 teaches a vehicular ladder rack comprising a stationary mounting frame including a pair of transverse frame members affixed to the roof of a vehicle, a positioning assembly including a pair of positioning members affixed to opposite end portions of an elongated longitudinal positioning element rotatable between a first and second position coupled to the pair of transverse frame member and a ladder support frame including a pair of ladder support members movable between a first and second position to support a ladder thereon operatively coupled between the pair of transverse frame member and the corresponding positioning member.

SUMMARY OF THE INVENTION

The present invention relates to a ladder storage and transport device to mount a ladder on the roof of a vehicle comprising a ladder positioning assembly pivotally mounted on the rear portion of the roof, an intermediate ladder support affixed to the mid-portion of the roof and a forward ladder limit or stop affixed to the forward portion of the roof. As described more fully hereinafter, the ladder positioning assembly is configured to engage and move the ladder between a retracted position for storage and transport, an intermediate position and an extended or deployed position for removal and use of the ladder.

The ladder positioning assembly comprises a support carriage pivotally mounted to the rear portion of the roof by a hinge or pivot means, a ladder positioning means to move the ladder between the retracted position and the extended position and a carriage damping means coupled between the forward portion of the support carriage and the roof. The operation of the ladder positioning means is controlled by a positioning drive control means as described more fully hereinafter.

The ladder positioning means comprises a positioning drive means and a ladder directional guide means.

The positioning drive means comprises a first ladder drive and a second ladder drive operatively coupled to a drive means by a drive element. The drive means comprises a drive motor to engage the drive element.

The carriage damping means comprises a hydraulic cylinder pivotally coupled to the carriage support by a first pivot means and a rod partially disposed within the hydraulic cylinder pivotally coupled to the roof of the vehicle by a second pivot means connected to a mounting plate. A piston including fluid flow channels is attached to the end portion of the rod disposed within the hydraulic cylinder to dampen movement of the carriage support pivoting about the hinge or carriage pivot means as the ladder is moved through the intermediate position.

The intermediate ladder support comprises a pair of intermediate ladder support elements affixed to the roof to support the side rails of the ladder thereon.

The forward ladder limit or stop comprises a hollow hood or shroud having a forward limit or stop attached thereto to engage the forward portion of the ladder when in the retracted position.

The ladder drive means is operatively coupled to the positioning drive control means to control the operation thereof. Specifically, the ladder drive control means comprises a first switch means and a second switch means operatively coupled to an external power source and to the drive motor.

To store a ladder on the roof, the distal end portions of the rails are positioned to engage the ladder positioning means. With the ladder so positioned, the drive motor is operated in the first or retraction direction to push or move the ladder upwardly along a diagonal path or direction until the center of gravity of the ladder and the support carriage causes the ladder and the support carriage to pivot forward such that the ladder is horizontally disposed. The ladder is pushed forward until the forward end of the rails engage a forward stop or limit, stopping the reversible drive motor so the ladder is secured on the roof for storage and transport.

To deploy the ladder from the stored position, the reversible drive motor is operated in the extending mode moving the ladder rearward in the horizontal plane relative to the roof. When the center of gravity of the ladder and support carriage reach the hinge or pivot means, the ladder and support carriage rotate to the diagonal.

The ladder will continue to move downwardly on a diagonal or inclined path or direction. When the distal ends of the rails are disposed within the support carriage the reversible drive motor is stopped. The ladder now can be manually removed from the ladder storage and transport device for use.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2 is a side view of a truck with the ladder storage and transport device with the ladder in the intermediate position between the fully retracted or stored position and the fully extended or deployed position.

FIG. 3 is a side view of a truck with the ladder storage and transport device with the ladder in the fully extended or deployed position.

Similar reference characters refer to similar parts through the several views of the drawings.

DETAILED DESCRIPTION OF THE PREFERRED EMBODIMENT

Figure 1:
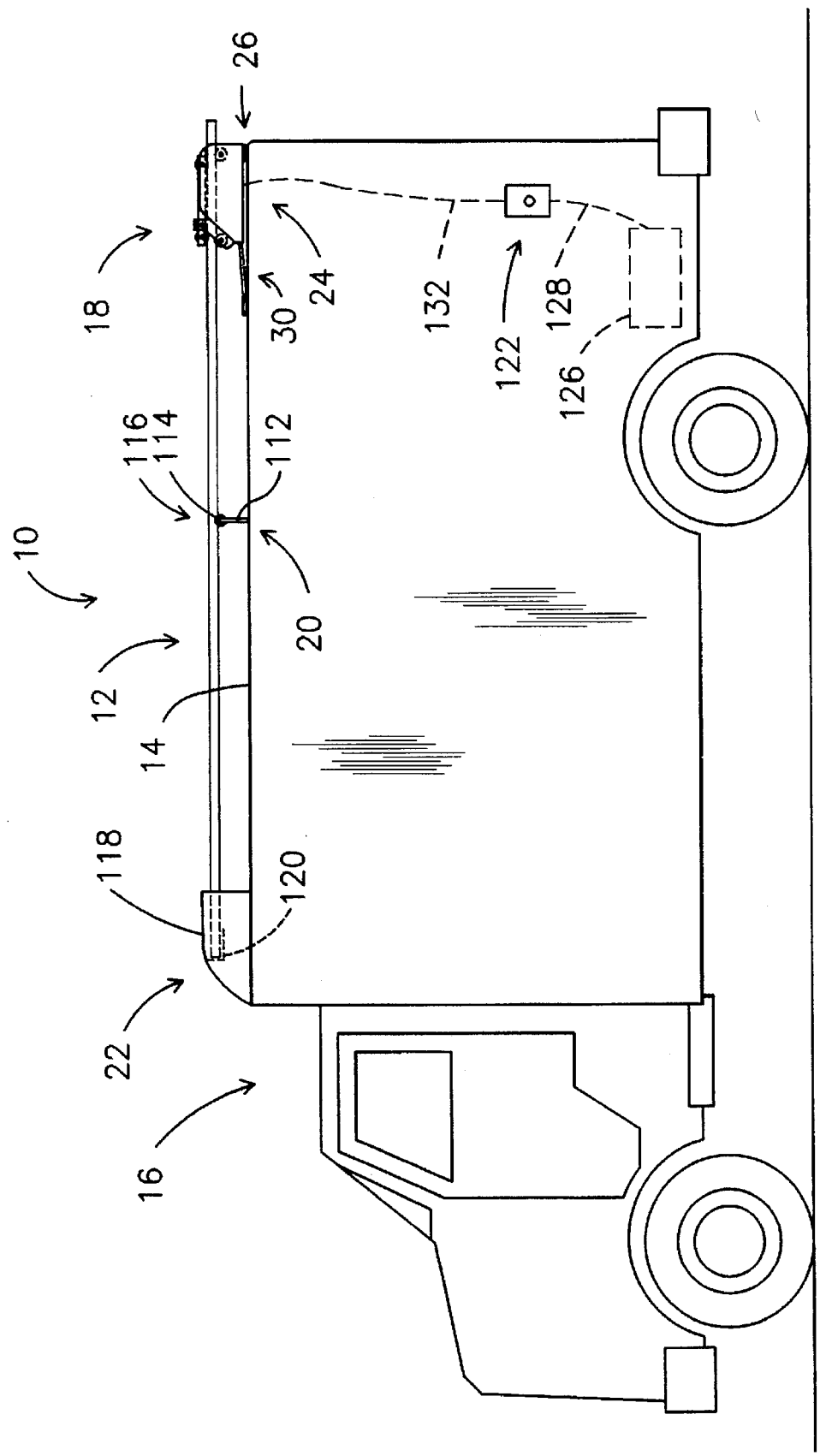
FIG. 1 is a side view of a truck with the ladder storage and transport device in the fully retracted or stored position.

As best shown in FIGS. 1 through 3, the present invention relates to a ladder storage and transport device generally indicated as 10 to mount a ladder generally indicated as 12 on the roof 14 of a vehicle generally indicated as 16. The ladder storage and transport device 10 comprises a ladder positioning assembly generally indicated as 18 pivotally mounted on the rear portion of the roof 14, an intermediate ladder support generally indicated as 20 affixed to the mid-portion of the roof 14 and a forward ladder limit or stop generally indicated as 22 affixed to the forward portion of the roof 14. As described more fully hereinafter, the ladder positioning assembly 18 is configured to engage and move the ladder 12 between a retracted position as shown in FIG. 1 for storage and travel, an intermediate position as shown in FIG. 2 and an extended or deployed position as shown in FIG. 3 for removal and use of the ladder 12.

Figure 4:
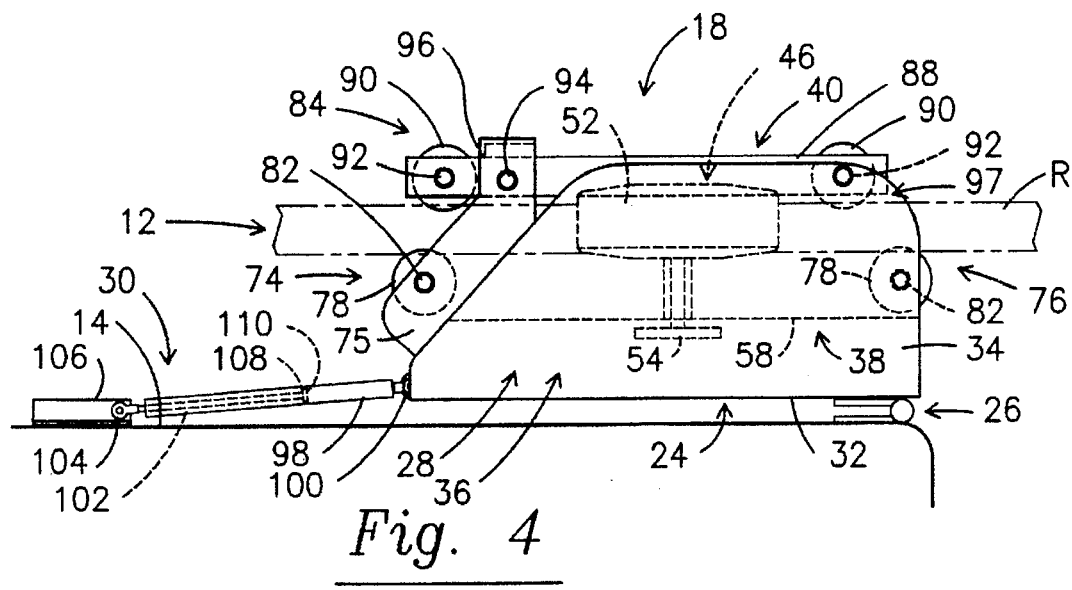
FIG. 4 is a detailed side view of the ladder positioning assembly with the ladder engaged.
Figure 5:
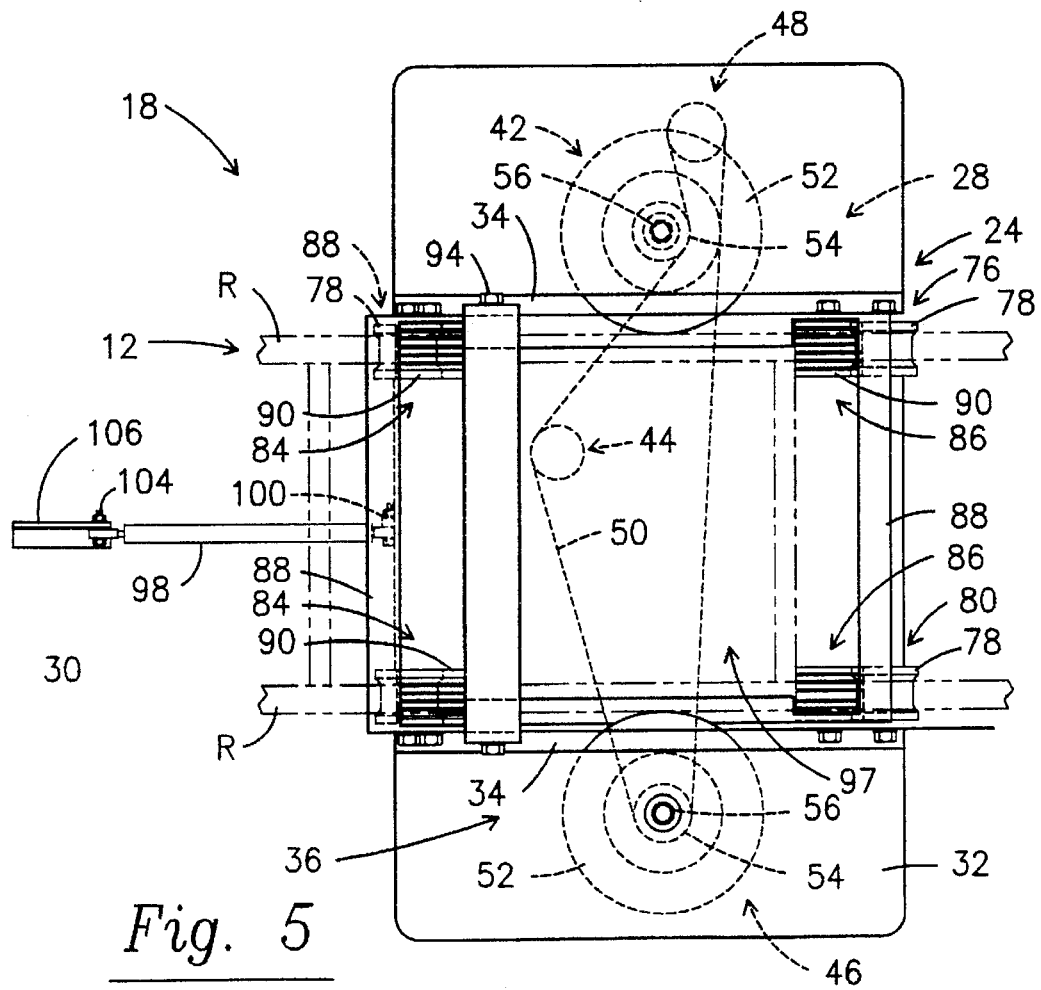
FIG. 5 is a detailed top view of the ladder positioning assembly with the ladder engaged.

As best shown in FIGS. 4 and 5, the ladder positioning assembly 18 comprises a support carriage generally indicated as 24 pivotally mounted to the rear portion of the roof 14 by a hinge or pivot means generally indicated as 26, a ladder positioning means generally indicated as 28 to move the ladder 12 between the retracted position as shown in FIG. 1 and the extended position as shown in FIG. 3 and a carriage damping means generally indicated as 30 coupled between the forward portion of the support carriage 24 and the roof 14. The operation of the ladder positioning means 28 is controlled by a positioning device control means as described more fully hereinafter.

As best shown in FIGS. 4 and 5, the support carriage 24 comprises a substantially horizontal base 32 having a pair of side members each indicated as 34 extending upwardly therefrom to operatively support the ladder positioning means 28 on the roof 14.

As best shown in FIGS. 4 through 7, the ladder positioning means 28 comprises a positioning drive means generally indicated as 36 to move the ladder 12 between the retracted position for storage and travel the intermediate position and the extended or deployed position for removal and use and a ladder directional guide means including a lower ladder support means generally indicated as 38 and an upper ladder retainer means generally indicated as 40.

Figure 6:
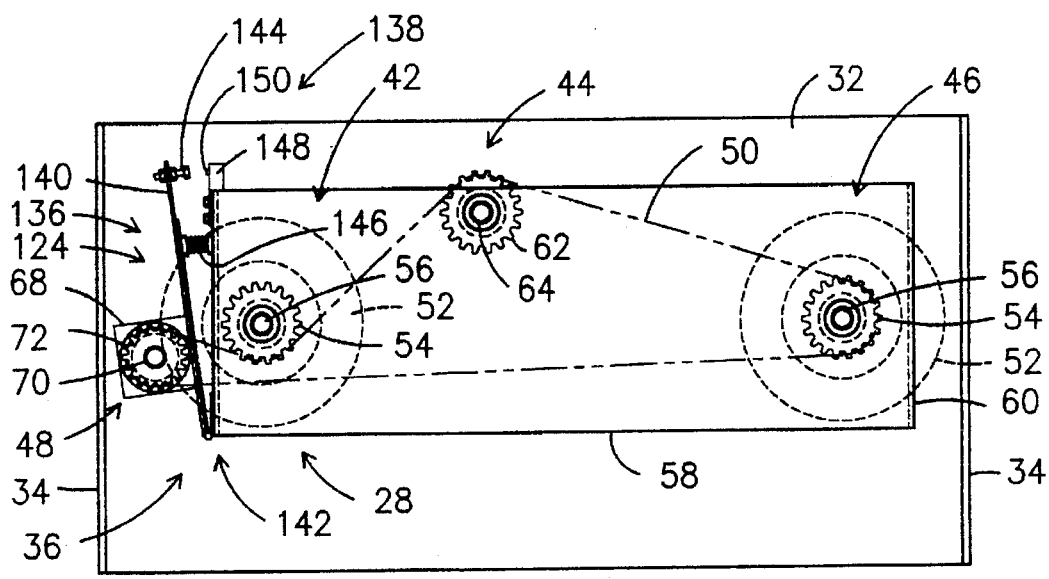
FIG. 6 is a detailed bottom view of the ladder drive means with the second drive control switch in the first or on position.
Figure 7:
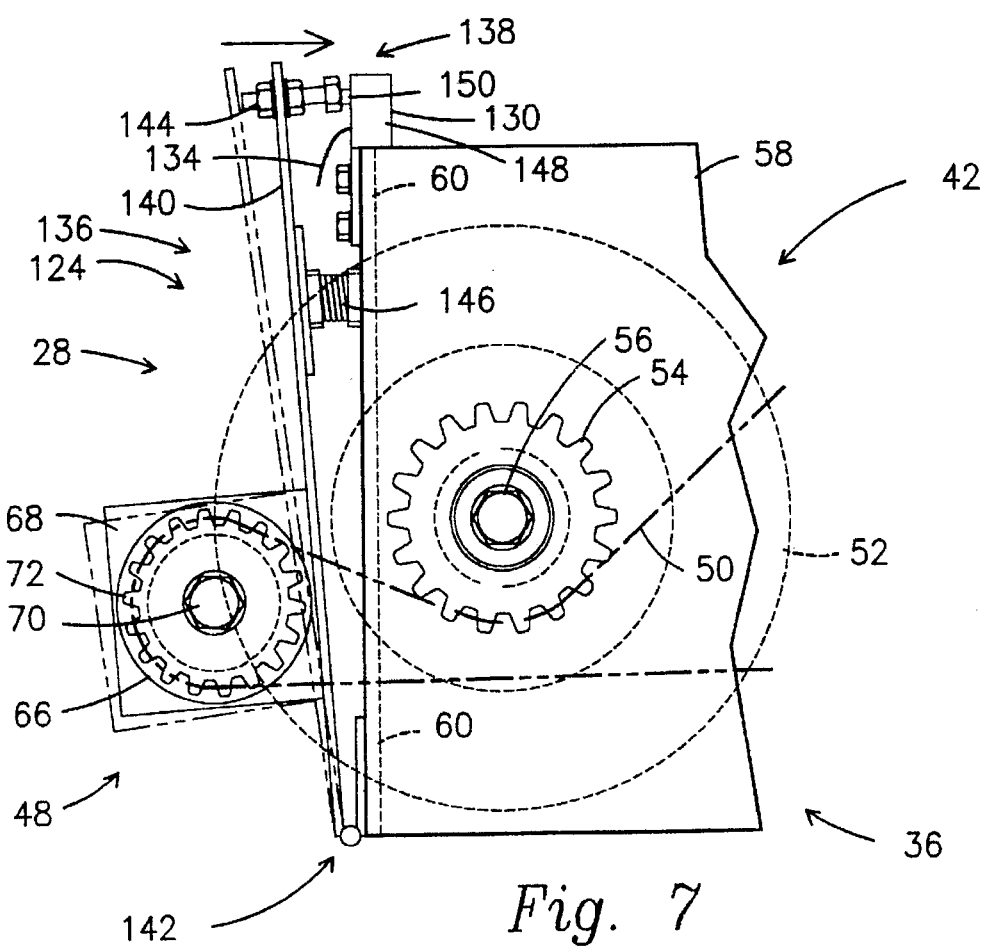
FIG. 7 is a partial detailed bottom view of the ladder drive means with the second drive control switch in the second or off position.

As best shown in FIGS. 6 and 7, the positioning drive means 36, selectively operable in a retracting mode and an extending mode, comprises a first ladder drive generally indicated as 42, a take-up idler generally indicated as 44 and a second ladder drive generally indicated as 46 operatively coupled to a drive means generally indicted as 48 by a drive element 50. The first ladder drive 42 and the second ladder drive 46 each comprises an upper ladder engaging member 52 such as a wheel to engage the side rails R of the ladder 12 and a lower drive coupling member 54 such as a gear to engage the drive element 50 such as a chain operatively interconnected to each other by a substantially vertical interconnecting member 56 rotatably mounted to a substantially horizontal support platform 58 attached to a pair of substantially parallel side supports each indicated as 60 disposed above the substantially horizontal base 32. The take-up idler 44 comprises an idler member 62 such as a gear to engage the drive element 50 rotatably mounted to the substantially horizontal support platform 58 by a substantially vertical support member 64. The drive means 48 comprises a reversible drive motor 66 selectively operable in a first and second direction affixed to a mounting plate 68 and an output drive shaft 70 to support an upper drive coupling member 72 such as a gear to engage the drive element 50.

As best shown in FIGS. 4 and 5, the lower ladder support means 38 comprises a front or first ladder support generally indicated as 74 operatively coupled between a pair of side member extensions each indicated as 75 and a rear or second ladder support generally indicated as 76 operatively mounted between the pair of side members 34 to support the side rails R of the ladder 12 in operative relationship relative to the ladder positioning means 38. The front ladder support 74 and the rear ladder support 76 each comprises a pair of rollers each indicated as 78 including a lower guide channel or groove 80 to receive the side rails R of the ladder 12 therein rotatably mounted on opposite end portions of a substantially horizontal roller support shaft 82 coupled to the pair of side member extensions 75 and the side members 34 respectively.

As best shown in FIGS. 4 and 5, the upper ladder retainer means 40 comprises a front or first ladder retainer generally indicated as 84 and a rear or second ladder retainer generally indicated as 86 operatively mounted between a pair of upper frame members 88 to retain the side rails R of the ladder 12 in operative relationship relative to the ladder positioning means 38. The front ladder retainer 84 and the rear ladder retainer 86 each comprises a pair of compressible rollers each indicated as 90 rotatably mounted on opposite end portions of a substantially horizontal roller support shaft 90 affixed to the pair of upper frame members 88. The pair of upper frame members 88 are pivotally coupled to the upper portion of the side member extensions 75 by a pair of pivot means 94. Clockwise movement of the pair of upper frame members 88 is limited by a stop or limit means 96 to restrict clockwise movement of the pair of upper frame member 38 relative to the horizontal plane to effectively or virtually sandwich the ladder 12 between the lower ladder support means 38 and upper ladder retainer means 40 when the ladder 12 is disposed with the channel or slot 97 formed between the lower ladder support means 38 and upper ladder support means 40 and the pair of side members 34.

As best shown in FIGS. 4 and 5, the front ladder support 74 and rear ladder support 76 are disposed outwardly of the front ladder retainer 84 and rear ladder retainer 86 to stabilize the ladder 12 disposed within the channel or slot 97.

As best shown in FIGS. 4 and 5, the carriage positioning or damping means 30 comprises a hydraulic cylinder 98 pivotally coupled to the carriage support 24 by a first pivot means 100 and a rod 102 partially disposed within the hydraulic cylinder 98 pivotally coupled to the roof 14 of the vehicle 16 by a second pivot means 104 connected to a mounting plate 106. A piston 108 including fluid flow channels 110 is attached to the end portion of the rod 102 disposed within the hydraulic cylinder 98 to dampen movement of the support carriage 24 pivoting about the hinge or carriage pivot means 26 as the ladder 12 is moved through the intermediate position as shown in FIG. 2. In addition, the relative linear movement between the piston 108 and the hydraulic cylinder 98 limit the rotational movement of the support carriage 24 relative to the roof 14.

As best shown in FIGS. 1 through 3, the intermediate ladder support 20 comprises a pair of intermediate ladder support elements each comprising an upright member 112 affixed to the roof in spaced relationship relative to each other and 14 having a support roller or member 114 including a support guide channel or groove 116 rotatably attached to the upper portion thereof to support the side rails R of the ladder 12 thereon.

As best shown in FIGS. 1 through 3, the forward ladder limit or stop 22 comprises a hollow hood or shroud 118 having a forward limit or stop 120 attached thereto to engage the forward portion of the ladder 12 when in the retracted position as shown in FIG. 1.

As best shown in FIGS. 1 through 3, 6 and 7, the ladder drive means 36 is operatively coupled to the positioning drive control means to control the operation thereof. Specifically, the ladder drive control means comprises a first switch means generally indicated as 122 and a second switch means generally indicated as 124 operatively coupled to an external power source 126 by conductors 128 and 130 respectively, and to the reversible drive motor 66 by conductors 132 and 134 respectively.

The first switch means 122 comprises a three position switch including a first, second and third position. As best shown in FIGS. 6 and 7, the second switch means 124 comprises a two position switch including a first switch element and a second switch element generally indicated as 136 and 138 respectively. The first switch element 136 comprises a first switch member 140 movable between a first and second position pivotally coupled to one of the side supports 60 by a hinge or pivot means generally indicated as 142 and a first switch activator member 144 attached to the end of the first switch member 140 opposite the hinge or pivot means 142. The first switch member 140 is normally biased in the first position by spring or bias 146. The reversible drive motor 66 is mounted to the first switch member 140 by the mounting plate 68. The second switch element 138 comprises a solenoid 148 and a plunger or second switch activator member 150 movable between a first and second position.

To store a ladder 12 on the roof 14, the distal end portions of the rails R are placed into the slot or channel 97 to engage the positioning drive means 36, lower ladder support means 38 and upper ladder retainer means 40. With the ladder 12 so positioned, the first switch means 122 is placed in the second position with the second switch means 124 biased in the second position as shown in FIG. 6. With the first and second switch means 122 and 124 each in the second position, the positioning drive means 36 or reversible drive motor 66 will operate in the first or retracting mode to pull or move the ladder 12 upwardly along a diagonal path or direction as shown in FIG. 3 until the center of gravity of the ladder 12 and the support carriage 24 is centered over or vertically aligned with the pivot or hinge 36 causing the ladder 12 and the support carriage 24 to pivot forward about pivot 26 such that the ladder 12 is horizontally disposed as shown in FIG. 2. The ladder engaging members 52 continue to move or drive the ladder 12 forward until the forward end of the rails R engage the forward stop or limit 120 as shown in FIG. 1, causing the first switching member 140 to pivot about the hinge or pivot means 142 against the bias 146 such that the first switch actuator member 144 engages the second switch actuator member 150 such that second switch means 124 is in the first position to stop the reversible drive motor 66 to secure the ladder 12 on the roof 14 for storage and transport.

To deploy the ladder 12 from the stored position as shown in FIG. 1, the first switch means 122 is placed and held in the third position causing the positioning device means 36 or reversible drive motor 66 to operate in the second or deployment direction moving the ladder 12 rearward in the horizontal plane as shown in FIG. 2. When the center of gravity of the ladder 12 and support carriage 24 is centered over the hinge or pivot means 26, the ladder 12 and support carriage 24 will rotate to the diagonal as shown in FIG. 3.

With the first switch means 122 held in the third position, the ladder will continue to move downwardly on a diagonal or inclined path. When the distal ends of the rails are disposed within the slot or channel 97, the first switch means 122 is returned to the first position to stop the positioning drive means 36. The ladder 12 now can be manually removed from the ladder 12 storage and transport device 10 for use.

The hydraulic cylinder 98 and the piston 108 combination dampen the rotation of the support carriage 24 to prevent the ladder 12 from pivoting too rapidly.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A ladder storage and transport device for use with a vehicle to receive and support a ladder thereon comprising a ladder positioning assembly including a support carriage pivotally mounted to a rear portion of the roof of the vehicle to operatively support a ladder positioning means thereon, said ladder positioning means comprises a ladder directional guide means to receive and support the ladder thereon and a positioning drive means to engage the ladder and selectively operate in a retracting mode and an extending mode to selectively move the ladder disposed on said ladder directional guide means to position the ladder in a retracted position relative to the roof of the vehicle for storage and travel when operating in the retracting mode and to position the ladder in an extending position relative to the rear of the vehicle for removal therefrom for use of the ladder when operating in the extending mode.

2. The ladder storage and transport device of claim 1 wherein said positioning drive means comprises a first ladder drive disposed to engage the ladder when supported on said ladder directional guide means operatively coupled to a drive means by a drive element.

3. The ladder storage and transport device of claim 2 further including a second ladder drive disposed to engage the ladder and operatively coupled to said drive means by said drive element.

4. The ladder storage and transport device of claim 3 wherein said first ladder drive and said second ladder drive each comprises an upper ladder engaging wheel to engage the side rails of the ladder and a lower drive coupling gear to engage said drive element.

5. The ladder storage and transport device of claim 4 further including a take-up idler comprising idler gear to engage said drive element.

6. The ladder storage and transport device of claim 3 wherein said drive means comprises a reversible drive motor selectively operable in a retracting direction when said ladder storage and transport device is operating in said retracting mode and an extending direction when said ladder storage and transport device is operating in said extending mode.

7. The ladder storage and transport device of claim 1 wherein said ladder directional guide means includes a lower ladder support means to support the ladder thereon.

8. The ladder storage and transport device of claim 7 wherein said lower ladder support means comprises a first ladder support and a second ladder support attached to said support carriage to support the side rails of the ladder in operative relationship relative to said ladder positioning means.

9. The ladder storage and transport device of claim 8 wherein said first ladder support and said second ladder support each comprises a pair of rollers including a lower guide channel to receive the side rails of the ladder therein rotatably mounted on opposite end portions of a substantially horizontal roller support shaft.

10. The ladder storage and transport device of claim 7 further including an upper ladder retainer means to engage and retain the ladder in operative relationship relative to said lower ladder support means when supported thereon.

11. The ladder storage and transport device of claim 10 wherein said upper ladder retainer means includes first ladder retainer and a second ladder retainer attached to said support carriage to retain the side rails of the ladder in operative relationship relative to said lower ladder support means.

12. The ladder storage and transport device of claim 11 wherein said front ladder retainer and said rear ladder retainer each comprises a pair of rollers rotatably mounted on opposite end portions of a substantially horizontal roller support shaft.

13. The ladder storage and transport device of claim 10 wherein said upper ladder retainer means is pivotally coupled to said support carriage.

14. The ladder storage and transport device of claim 13 wherein clockwise movement of said upper ladder retainer means is limited by a stop means to restrict clockwise movement of said upper ladder retainer means relative to the horizontal plane to retain the ladder between said lower ladder support means and said upper ladder retainer means when the ladder is disposed with a channel formed between said lower ladder support means and said upper ladder support means.

15. The ladder storage and transport device of claim 1 wherein said ladder directional guide means comprises a lower ladder support means including a first ladder support and an upper ladder retainer means including a first ladder retainer cooperatively forming a channel therebetween.

16. The ladder storage and transport device of claim 15 wherein said lower ladder support means further includes a second ladder support and said upper ladder retainer means further includes a second ladder retainer.

17. The ladder storage and transport device of claim 16 wherein said front ladder support and said second ladder support each comprises a pair of rollers including a lower guide channel or groove to receive the side rails of the ladder and said front ladder retainer and said rear ladder retainer each comprises a pair of rollers.

18. The ladder storage and transport device of claim 17 wherein said front ladder support and said rear ladder support are disposed outwardly of said front ladder retainer and said rear ladder retainer to stabilize the ladder disposed within said channel.

19. The ladder storage and transport device of claim 1 further including a carriage damping means coupled between said support carriage and the roof to dampen the pivoting of said support carriage.

20. The ladder storage and transport device of claim 19 wherein said carriage damping means comprises a hydraulic cylinder pivotally coupled to said support carriage by a first pivot means and a rod partially disposed within said hydraulic cylinder pivotally coupled to the roof by a second pivot means; a piston including fluid flow channels attached to the end portion of said rod disposed within said hydraulic cylinder to dampen movement of said support carriage pivoting about a pivot means as the ladder is moved between the extended and retracted positions.

21. The ladder storage and transport device of claim 1 further including an intermediate ladder support affixed to the mid-portion of said roof.

22. The ladder storage and transport device of claim 21 wherein said intermediate ladder support comprises a pair of intermediate ladder support elements each comprising an upright member affixed to opposite sides of the roof having a support roller including a support guide channel rotatably attached to the upper portion thereof to support the side rails of the ladder thereon.

23. The ladder storage and transport device of claim 1 further including a ladder limit affixed to the forward portion of the roof to limit the forward movement of the ladder relative to the roof during retraction thereof.

24. The ladder storage and transport device of claim 23 wherein said ladder limit comprises a hollow shroud having a forward stop attached thereto to engage the forward portion of the ladder when in the retracted position.

25. The ladder storage and transport device of claim 1 wherein said ladder drive means is operatively coupled to a positioning drive control means to control the operation thereof.

26. The ladder storage and transport device of claim 25 wherein said positioning drive control means comprises a first switch means including a retracting position and an extending position.

27. The ladder storage and transport device of claim 26 further including a second switch means including a retracting position.

28. The ladder storage and transport device of claim 27 wherein said second switch means comprises a first switch element and a second switch element.

29. The ladder storage and transport device of claim 28 wherein said first switch element comprises a first switch member movable between a first and second position pivotally coupled to said support carriage by a pivot means and a first switch activator member attached to the end of said first switch member opposite said pivot means, said first switch member normally biased in said first position by a bias and said second switch element comprises a plunger and a second switch activator member movable between a first and second position such that when said first switch means and second switch means each in said retracting position, the positioning drive means will operate in said retracting mode to move the ladder upwardly along a diagonal path or direction until the center of gravity of the ladder and said support carriage is centered over or vertically aligned with said hinge causing the ladder and said support carriage to pivot forward about said hinge until the ladder is horizontally disposed, said ladder engaging members continue to move the ladder forward until the forward end of the rails engage said limit causing said first switching member to pivot said pivot means against said bias such that said first switch actuator member engages the second switch actuator member to move said second switch means to said first position to stop said reversible drive motor to secure the ladder on the roof for storage and transport.

30. The ladder storage and transport device of claim 29 wherein the said first switch means is placed in said extending position causing said positioning device means motor to operate in said extending direction moving the ladder rearward in the horizontal plane until the center of gravity of the ladder and said support carriage is centered over said pivot means such that the ladder and said support carriage will rotate to the diagonal and to continue to move the ladder downwardly on a diagonal or inclined path to permit the operator to manually remove the ladder from said ladder storage and transport device.

* * * * *